United States Patent
Granberg et al.

(10) Patent No.: US 6,304,054 B1
(45) Date of Patent: Oct. 16, 2001

(54) ELECTRICAL SYSTEM FOR MOTOR VEHICLES

(75) Inventors: Anders Granberg, Huddinge; Bengt Blomberg, Järna, both of (SE)

(73) Assignee: Scania CV Aktiebolag (SE)

( * ) Notice: Subject to any disclaimer, the term of this patent is extended or adjusted under 35 U.S.C. 154(b) by 0 days.

(21) Appl. No.: 09/378,892

(22) Filed: Aug. 23, 1999

(30) Foreign Application Priority Data

Sep. 2, 1998 (SE) .................................................. 9802954-9

(51) Int. Cl.[7] .......................................................... H02J 7/00
(52) U.S. Cl. ............................................. 320/104; 307/10.1
(58) Field of Search ........................... 307/10.1; 320/104, 320/103, 121, 138; 322/37

(56) References Cited

U.S. PATENT DOCUMENTS

| | | | | |
|---|---|---|---|---|
| 4,233,552 | * | 11/1980 | Baumbach | 320/104 |
| 5,162,720 | * | 11/1992 | Lambert | 320/104 |
| 5,448,152 | * | 9/1995 | Albright | 320/104 |
| 5,633,577 | * | 5/1997 | Matsumae et al. | 322/37 |
| 5,717,310 | * | 2/1998 | Sakai et al. | 307/10.1 |
| 5,726,551 | * | 3/1998 | Miyazaki et al. | 320/104 |
| 5,726,557 | * | 3/1998 | Umeda et al. | 322/21 |
| 5,818,200 | * | 10/1998 | Cummings et al. | 320/116 |
| 5,883,496 | * | 3/1999 | Esaki et al. | 320/104 |
| 5,896,022 | * | 4/1999 | Jacobs, Sr. | 320/103 |
| 5,929,596 | * | 7/1999 | Farrell | 320/104 |
| 5,977,652 | * | 11/1999 | Frey et al. | 307/10 |
| 5,977,744 | * | 11/1999 | Williams et al. | 320/104 |
| 6,121,750 | * | 12/1998 | Hwa | 320/104 |

FOREIGN PATENT DOCUMENTS

| | | |
|---|---|---|
| 19628222 | 7/1996 | (DE) . |
| 2729901 | 1/1995 | (FR) . |
| 72990 | 1/1995 | (FR) . |
| 962822 | 7/1996 | (GB) . |

* cited by examiner

*Primary Examiner*—Peter S. Wong
*Assistant Examiner*—Pia Tibbits
(74) *Attorney, Agent, or Firm*—Ostrolenk, Faber, Gerb & Soffen, LLP

(57) ABSTRACT

An electrical system (1) for motor vehicles, with a generator (6) and with double batteries (3,7), one of them a starting battery (3) and the other a consumer battery (7), has a charging regulator (9) between the generator and the starting battery. The charging regulator (9) is arranged between the batteries (3,7) and separates them and can regulate the magnitude of the charging current to the starting battery (3).

6 Claims, 1 Drawing Sheet

ELECTRICAL SYSTEM FOR MOTOR VEHICLES

TECHNICAL DOMAIN

The present invention relates to an electrical system with double batteries, particularly for motor vehicles.

STATE OF THE ART

A practice known from, for example, DE 40 28 242 A1 is the use of double batteries in an electrical system for motor vehicles. In such cases, the starting battery and the starter motor form a starting battery side, while the generator, consumer battery and other consumers form a consumer battery side. A problem with this type of electrical system is that of simply and safely separating the two battery sides so that the starting battery is always kept well charged. Another problem with known solutions is that they often use relays which, like cables and contact devices, have to be amply dimensioned in order to cope with the currents which occur during charging.

OBJECT OF THE INVENTION

The invention has the object of providing an electrical system which constitutes a simple, inexpensive and reliable solution for separating the two batteries. A further object is to ensure that the starting battery is kept as well charged as possible.

SUMMARY OF THE INVENTION

The object of the invention is achieved by executing the aforeside electrical system by providing a charging regulator.

The chosen location of the charging regulator creates a simple separation of the batteries, while current regulation to the starting battery creates the possibility of moderate charging currents which permit relatively thin conductors and connections.

Further providing the charging regulator with transistors of a special type creates the possibility of safe supply of current from each battery to an engine control unit which is essential for the operation of the engine.

DESCRIPTION OF THE DRAWINGS

The invention is described below with reference to the drawings, in which.

DESCRIPTION OF A PREFERRED EMBODIMENT

Figure 1:
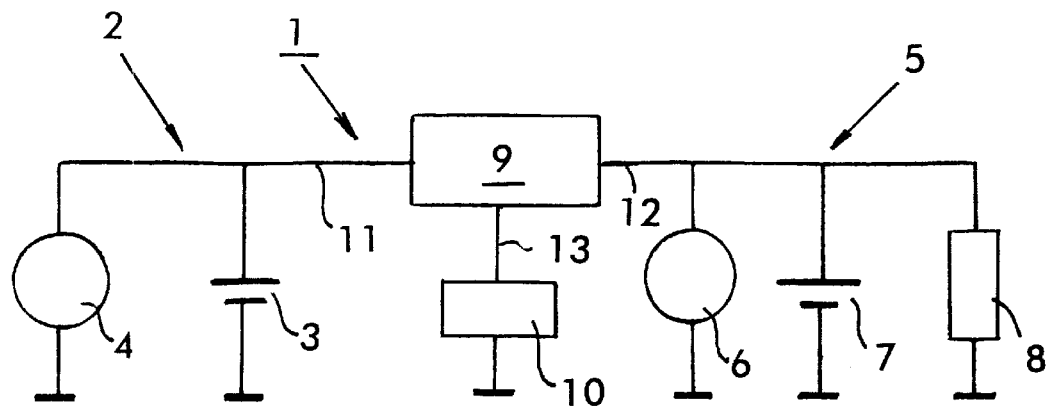
FIG. 1 depicts schematically an electrical system for a vehicle.

An electrical system 1 (in FIG. 1) intended for a motor vehicle includes not only a starting battery side 2 with a starting battery 3 and a starter motor 4 but also a consumer side 5 with a generator 6, a consumer battery 7 and a number of consumers here represented by a consumer 8. As used herein, the term "consumer" means a device in the car which uses electrical energy. Between the starting battery side 2 and the consumer battery side 5 there is a charging regulator 9 which controls the current between the two sides. An engine control device 10 is connected to the charging regulator 9 and receives via the latter its power supplied either from the starting battery side 2 or from the consumer battery side 5, as will be described in more detail further on. The charging regulator 9 is connected to the electrical system 1 via conductors 11, 12 and 13.

Figure 2:
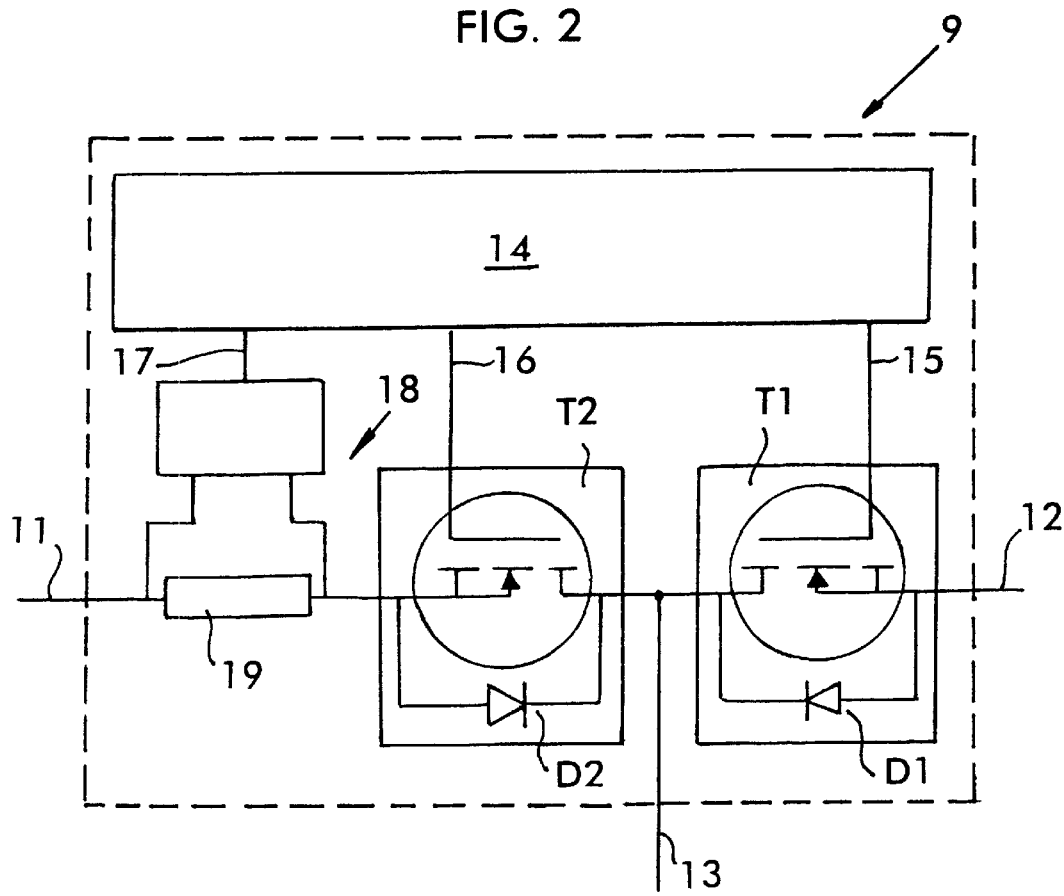
FIG. 2 depicts in more detail the charging regulator of FIG. 1.

As may be seen in more detail in FIG. 2, there is in the charging regulator 9 an electronic control device 14 with connections 15, 16 and 17. Two transistors T1 and T2 are each connected respectively to connections 15 and 16 and receive their control signals from the control device 14. In conductor 11 there is, after transistor T2, a measuring device 18 with a current shunt 19 for measuring the strength of the current in the conductor 11. The control device 14 receives via the conductor 17 a signal representing the measured strength of the current.

In the embodiment depicted, the two transistors T1 and T2 are MOSFET transistors (enrichment type, N-channel) and are connected together by common D-electrodes in the conductor 13. The respective diodes D1 and D2 built into the two transistors are directed towards one another and can both allow current to pass to conductor 13.

Operation is as follows:

In inactive states of the electrical system 1, the starting battery side 2 and the consumer battery side 5 are kept separate by the fact that transistors T1 and T2 block contact between conductors 11 and 12. Despite this, the engine control device 10 can nevertheless be supplied with current from whichever of the batters 3 and 7 has the higher voltage. This takes place via diodes D1 and D2. Starting can thus take place even if the consumer battery 7 is completely uncharged.

In active states of the electrical system 1, when the engine is running and the generator 6 is charging, transistor T1 turns on in order to reduce the power losses in the transistor. This is achieved by diode D1 in the transistor being bypassed and the current passing through the transistor instead. When the generator begins to charge, transistor T2 is turned on slowly by the control device 14. This means that the powerful current peak created when the generator begins to charge is eliminated and the maximum strength of current to the starting battery in conductor 11 can be limited to a desired level. When the strength of current has decreased sufficiently and the starting batteries 3 is charged, the control device 14 disconnects the current to the starting battery by turning off transistors T1 and T2. This reduces the water consumption in the starting battery.

Transistor T2 is controlled analogously (i.e., by applying an analog signal thereto from the engine control unit 14 via the conductor 16) in order to achieve the graduated current regulation referred to. The control of transistor T1 may, however, be analog or digital by applying either analog or digital signals thereto from the engine control unit 14 via the conductor 15.

And advantage of the electrical system 1 according to the invention is that the vehicle will continue to travel even if the control device 14 ceases to function. Although the charging of the starting battery 3 ceases when transistor 2 cannot be turned on, but this malfunction can be indicated to the driver so that the fault can be rectified.

The resulting strength of current in conductor 11 may be adjusted as necessary by suitable choice of transistors T1 and T2 and by suitable control of them.

What is claimed is:

1. An electrical system for motor vehicles having a plurality of consumers, comprising:

a starter motor;

a generator;

a pair of batteries, one battery being a starting battery connected to the starter motor and the other battery being a consumer battery connected to the consumers; and a charging regulator connected between the generator and the starting battery, the charging regulator being arranged between the pair of batteries to keep them separated from one another and to regulate the magnitude of the charging current to the starting battery, the charging regulator including first and second transistors and an electronic controller for controlling the first and second transistors, the first transistor being connected to the generator and the second transistor being connected to the starting battery, the electronic controller regulating the current to the starting battery from the generator by slowly turning on the second transistor when the generator begins to charge the starting battery and turning off the second transistor when the current has decreased to a predetermined value corresponding to the starting battery being fully charged.

2. An electrical system according to claim 1, wherein the first and second transistors are MOSFET transistors which are arranged in series between the generator and the starting battery and which have their D-electrodes connected together.

3. An electrical system according to claim 1, wherein the electronic controller turns on the first transistor by applying an analog or a digital signal thereto when the generator charges the starting battery.

4. An electrical system according to claim 1, further including a measuring device for measuring the charging current to the starting battery, the measuring device being connected to the electronic controller.

5. An electrical system according to claim 2, wherein the charging regulator is provided with an output to an engine control unit and is arranged to deliver current from whichever of the batteries has the higher voltage, the engine control unit being connected to the mutually connected D-electrodes.

6. An electrical system according to claim 5, wherein respective protective diodes are incorporated in each of the first and second transistors.

* * * * *